US012780056B2

(12) United States Patent
Kim et al.

(10) Patent No.: US 12,780,056 B2
(45) Date of Patent: Nov. 3, 2026

(54) ROTATION MECHANISM AND SEAT INCLUDING THE SAME

(71) Applicants: Hyundai Motor Company, Seoul (KR); Kia Corporation, Seoul (KR)

(72) Inventors: Mu Young Kim, Osan-si (KR); Hee Dong Choi, Hwaseong-si (KR); Seok Ju Gim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 176 days.

(21) Appl. No.: 18/641,573

(22) Filed: Apr. 22, 2024

(65) Prior Publication Data

US 2025/0187502 A1 Jun. 12, 2025

(30) Foreign Application Priority Data

Dec. 12, 2023 (KR) ........................ 10-2023-0179205

(51) Int. Cl.

*B60N 2/20* (2006.01)
*B60N 2/02* (2006.01)
*B60N 2/34* (2006.01)

(52) U.S. Cl.

CPC ......... *B60N 2/203* (2013.01); *B60N 2/02258* (2023.08); *B60N 2/34* (2013.01)

(58) Field of Classification Search

CPC ...... B60N 2/203; B60N 2/02258; B60N 2/34; B60N 2/36; B60N 2/02246; B60N 2/995; B60N 2/143; B60N 2/169; B60N 2/64; B60N 2/68; B60N 2/70; B60Y 2304/03; B60Y 2304/05

See application file for complete search history.

(56) References Cited

U.S. PATENT DOCUMENTS

| | | | | | |
|---|---|---|---|---|---|
| 2,567,612 | A * | 9/1951 | Mcgehee | A47C 3/0255 | 248/370 |
| 4,114,610 | A * | 9/1978 | Koch | A61H 1/02 | 601/24 |
| 4,805,960 | A * | 2/1989 | Tacker | A47C 1/0355 | 297/86 |
| 4,848,840 | A * | 7/1989 | Toya | B60N 2/753 | 297/335 |
| 4,915,444 | A * | 4/1990 | Rogers, Jr. | A47C 1/0355 | 297/69 |
| 5,326,153 | A * | 7/1994 | Muffi | A47C 17/04 | 297/DIG. 7 |
| 5,588,710 | A * | 12/1996 | Wiecek | A47C 1/0355 | 297/85 L |
| 5,772,278 | A * | 6/1998 | Kowalski | A47C 1/0355 | 297/85 L |

(Continued)

FOREIGN PATENT DOCUMENTS

KR 102484935 B1 1/2023

*Primary Examiner* — Medhat Badawi

(74) *Attorney, Agent, or Firm* — Slater Matsil, LLP

(57) ABSTRACT

A seat for a vehicle can include a seat rest, a backrest rotatable with respect to the seat rest, and a rotation mechanism configured to rotate the backrest with respect to the seat rest, wherein, by the rotation mechanism, the backrest is configured to be rotatable in a first direction within a preset angle range and be rotatable in a second direction within the angle range, where the first direction may be opposite the second direction.

20 Claims, 8 Drawing Sheets

(56) References Cited

U.S. PATENT DOCUMENTS

| | | | | |
|---|---|---|---|---|
| 6,540,291 | B2 * | 4/2003 | Hoffman | A47C 1/0355 297/84 |
| 6,554,354 | B1 * | 4/2003 | Hoffman | A47C 7/70 297/145 |
| 6,588,841 | B1 * | 7/2003 | Hoffman | A47C 3/0255 297/270.3 |
| 7,021,711 | B1 * | 4/2006 | Hoffman | A47C 3/027 297/270.3 |
| 7,475,944 | B2 * | 1/2009 | Griepentrog | A47C 17/175 297/85 L |
| 7,552,972 | B2 * | 6/2009 | Ferrari | B60N 2/3011 296/65.09 |
| 7,607,180 | B2 * | 10/2009 | Griepentrog | A47C 17/165 5/47 |
| 7,731,276 | B2 * | 6/2010 | Hoffman | A47C 1/0355 297/259.2 |
| 8,016,359 | B2 * | 9/2011 | Dillinger | B60N 2/753 297/411.32 |
| 8,297,693 | B2 * | 10/2012 | Hoffman | A47C 3/0255 297/85 M |
| 8,544,950 | B2 * | 10/2013 | Merensky | B60N 2/3084 297/451.3 |
| 8,752,890 | B2 * | 6/2014 | Murphy | A47C 1/037 297/423.35 |
| 9,156,385 | B1 * | 10/2015 | Lewis | B60N 2/767 |
| 9,241,571 | B2 * | 1/2016 | Robertson | A47C 1/031 |
| 9,332,844 | B2 * | 5/2016 | Regev | A47C 3/025 |
| 9,398,812 | B2 * | 7/2016 | Sanae | A47C 7/54 |
| 9,468,295 | B2 * | 10/2016 | Lawson | A47C 1/0355 |
| 9,655,458 | B2 * | 5/2017 | Jacobs | A47C 1/121 |
| 9,656,578 | B2 * | 5/2017 | Mitsuhashi | B60N 2/3075 |
| 9,987,953 | B2 * | 6/2018 | Kimura | B60N 2/919 |
| 10,182,659 | B2 * | 1/2019 | Kuhl | A47C 17/86 |
| 10,327,553 | B2 * | 6/2019 | Kiwak | A47C 3/0251 |
| 10,441,081 | B2 * | 10/2019 | Carrera | A47C 1/024 |
| D885,783 | S * | 6/2020 | Menescardi | D6/381 |
| 10,813,457 | B2 * | 10/2020 | Kiwak | A47C 1/0345 |
| 10,829,008 | B2 * | 11/2020 | Sasaki | B60N 2/1615 |
| 10,874,574 | B1 * | 12/2020 | Ruby | A61G 15/02 |
| 10,888,162 | B1 * | 1/2021 | McLennan | A47C 1/124 |
| 10,906,437 | B2 * | 2/2021 | Hunter | A47K 3/32 |
| 11,076,700 | B2 * | 8/2021 | Kuhl | A47C 17/04 |
| 11,110,023 | B1 * | 9/2021 | Knight | A47C 1/03211 |
| 11,122,898 | B2 * | 9/2021 | Kiwak | A47C 7/506 |
| 11,174,893 | B1 * | 11/2021 | Freer | F16C 1/16 |
| 11,412,853 | B2 * | 8/2022 | Kiwak | A47C 1/0347 |
| 11,457,742 | B1 * | 10/2022 | Zhang | A47C 4/02 |
| 11,478,083 | B1 * | 10/2022 | Li | A47C 17/04 |
| 11,564,496 | B1 * | 1/2023 | Li | A47C 1/0355 |
| 11,832,726 | B2 * | 12/2023 | Murphy | A47C 1/0355 |
| 11,832,727 | B2 * | 12/2023 | Murphy | A47C 1/0355 |
| 11,964,597 | B2 * | 4/2024 | Holder | B60N 2/1695 |
| 12,458,146 | B2 * | 11/2025 | Murphy | A47C 1/0355 |
| 2002/0093227 | A1 * | 7/2002 | Williams | A47C 17/04 297/116 |
| 2002/0149238 | A1 * | 10/2002 | Hoffman | A47C 1/03255 297/85 R |
| 2003/0015893 | A1 * | 1/2003 | Hoffman | G06F 17/142 297/85 R |
| 2003/0022771 | A1 * | 1/2003 | Stearns | A63B 21/4047 482/142 |
| 2003/0022772 | A1 * | 1/2003 | Stearns | A63B 23/0405 482/142 |
| 2003/0070225 | A1 * | 4/2003 | Murphy | A47C 17/2076 5/13 |
| 2005/0023875 | A1 * | 2/2005 | Sirjoo | A47C 3/16 297/354.13 |
| 2005/0104420 | A1 * | 5/2005 | Murphy | A47C 1/0355 297/85 L |
| 2005/0146179 | A1 * | 7/2005 | Murphy | A47C 1/124 297/248 |
| 2005/0253430 | A1 * | 11/2005 | George | A47C 1/124 297/233 |
| 2006/0108840 | A1 * | 5/2006 | Murphy | A47C 1/0355 297/68 |
| 2006/0214459 | A1 * | 9/2006 | Kammerer | B60N 2/309 296/65.09 |
| 2006/0284451 | A1 * | 12/2006 | Hoffman | A47C 3/16 297/125 |
| 2006/0290174 | A1 * | 12/2006 | Hoffman | A47C 1/0355 297/84 |
| 2007/0126267 | A1 * | 6/2007 | Hoffman | A47C 1/0355 297/84 |
| 2007/0151023 | A1 * | 7/2007 | Murphy | A47C 17/17 5/13 |
| 2007/0163475 | A1 * | 7/2007 | Murphy | A47B 9/00 108/147 |
| 2007/0210635 | A1 * | 9/2007 | Wulf | B60N 2/0705 297/316 |
| 2007/0252368 | A1 * | 11/2007 | Balser | B60R 21/0134 280/730.2 |
| 2007/0252422 | A1 * | 11/2007 | Beaver | A47C 7/506 297/423.24 |
| 2007/0283491 | A1 * | 12/2007 | Murphy | A47C 17/213 5/13 |
| 2008/0012396 | A1 * | 1/2008 | Hoffman | A47C 1/0355 297/85 L |
| 2008/0023992 | A1 * | 1/2008 | Hoffman | A47C 1/0242 297/85 R |
| 2008/0036248 | A1 * | 2/2008 | Beaver | A47C 1/0355 297/329 |
| 2008/0079301 | A1 * | 4/2008 | Schaaf | A47C 3/026 297/313 |
| 2009/0072593 | A1 * | 3/2009 | Hoffman | A47C 1/037 297/408 |
| 2009/0167046 | A1 * | 7/2009 | Yamagishi | B60N 2/3013 297/340 |
| 2009/0167068 | A1 * | 7/2009 | Yamagishi | B60N 2/12 297/340 |
| 2009/0235452 | A1 * | 9/2009 | Hoffman | A47C 17/2076 5/13 |
| 2010/0127538 | A1 * | 5/2010 | Hoffman | A47C 3/18 297/68 |
| 2010/0127555 | A1 * | 5/2010 | Hoffman | A47C 3/0255 297/344.21 |
| 2010/0127556 | A1 * | 5/2010 | Hoffman | A47C 1/0355 297/84 |
| 2010/0283297 | A1 * | 11/2010 | Crum | A47C 7/50 297/423.28 |
| 2011/0010846 | A1 * | 1/2011 | Murphy | A47C 17/04 5/2.1 |
| 2011/0010847 | A1 * | 1/2011 | Murphy | A47C 17/04 5/35 |
| 2011/0018331 | A1 * | 1/2011 | Murphy | A47C 1/0355 297/85 R |
| 2011/0291460 | A1 * | 12/2011 | Murphy | A61G 5/14 297/85 M |
| 2011/0304193 | A1 * | 12/2011 | Murphy | A47C 1/034 297/85 M |
| 2012/0104827 | A1 * | 5/2012 | Murphy | A47C 1/037 297/85 M |
| 2012/0112517 | A1 * | 5/2012 | Hoffman | A47C 1/0355 297/85 L |
| 2012/0112518 | A1 * | 5/2012 | Murphy | A47C 1/0355 297/85 L |
| 2012/0112519 | A1 * | 5/2012 | Murphy | A47C 1/0355 297/85 M |
| 2012/0146364 | A1 * | 6/2012 | Hoffman | A47C 1/03266 297/84 |
| 2012/0286557 | A1 * | 11/2012 | Hoffman | A47C 1/03211 297/85 M |
| 2013/0011335 | A1 * | 1/2013 | Xie | G01N 33/5008 514/19.5 |
| 2013/0014327 | A1 * | 1/2013 | Downey | A47C 7/42 5/632 |
| 2013/0140855 | A1 * | 6/2013 | Murphy | A47C 1/037 297/61 |
| 2013/0140856 | A1 * | 6/2013 | Murphy | A47C 1/037 297/61 |

(56) References Cited

U.S. PATENT DOCUMENTS

2013/0175846 A1* 7/2013 Lawson .................. A61G 5/14 297/85 M
2013/0200658 A1* 8/2013 Hoffman .............. A47C 1/0342 297/75
2013/0200659 A1* 8/2013 Hoffman ................ A47C 1/035 297/84
2014/0167482 A1* 6/2014 Myre ..................... A47C 7/002 297/463.1
2014/0345044 A1* 11/2014 Murphy ............... A47C 17/225 5/14
2015/0135432 A1* 5/2015 Murphy ................. A47C 17/16 5/29
2015/0150376 A1* 6/2015 Hogue ................... A47C 1/026 297/183.5
2015/0245964 A1* 9/2015 Tsuber ................. A61G 5/1067 297/363
2015/0282619 A1* 10/2015 Lawson ............... A47C 1/0355 297/83
2015/0342358 A1* 12/2015 Murphy ................. A61G 7/012 5/400
2016/0045031 A1* 2/2016 Lawson ................. A47C 7/506 297/284.3
2016/0051057 A1* 2/2016 Murphy ............ A47C 17/2073 5/29
2016/0088942 A1* 3/2016 Murphy ............... A47C 1/0345 297/361.1
2016/0100686 A1* 4/2016 Regev .................. A47C 7/5068 297/270.1
2016/0100687 A1* 4/2016 Murphy ............... A47C 1/0347 297/271.3
2017/0071353 A1* 3/2017 Murphy ............... A47C 17/165
2017/0202359 A1* 7/2017 Murphy ............... A47C 17/207
2018/0027968 A1* 2/2018 Lawson ............... A47C 1/0355
2018/0064258 A1* 3/2018 Murphy ............... A47C 17/138
2018/0103761 A1* 4/2018 White .................. A47C 1/0352
2018/0161223 A1* 6/2018 Murphy ................. A61G 5/128
2018/0206644 A1* 7/2018 Murphy ................... A47C 3/18
2018/0297551 A1* 10/2018 Coakley ................. B60N 2/265
2019/0143852 A1* 5/2019 Ewel ........................ B60N 2/70 297/354.12
2020/0062148 A1* 2/2020 Yun ........................ B60N 2/165
2020/0085197 A1* 3/2020 Lucas .................. A47C 15/004
2020/0100593 A1* 4/2020 He ........................... A47C 7/38
2020/0100596 A1* 4/2020 He ......................... A47C 17/00
2020/0163458 A1* 5/2020 Murphy ............... A47C 1/0355
2020/0180474 A1* 6/2020 Moon .................. B60N 2/3093
2020/0231067 A1* 7/2020 Roman .................... B60N 2/50
2020/0352333 A1* 11/2020 Lapointe .............. A47C 1/0242
2021/0022506 A1* 1/2021 Murphy ............. A47C 1/03211
2021/0078450 A1* 3/2021 Tait ...................... B60N 2/0292
2021/0078613 A1* 3/2021 Meier ...................... B61D 1/04
2021/0100364 A1* 4/2021 Murphy ............... A47C 1/0355
2021/0347285 A1* 11/2021 Ravestein ............. B60N 2/309
2021/0394650 A1* 12/2021 Holder ..................... B60N 2/12
2022/0371495 A1* 11/2022 Nuss ...................... B60N 2/753
2022/0378207 A1* 12/2022 Murphy ............... A47C 1/0355
2022/0400863 A1* 12/2022 Murphy ............... A47C 1/0242
2023/0010099 A1* 1/2023 Murphy ................. A47C 1/037
2023/0017194 A1* 1/2023 Slater ..................... A47C 17/04
2023/0068014 A1* 3/2023 Sun .................... A47C 1/03211
2023/0191956 A1* 6/2023 Meier ................ B64D 11/0648 296/65.09
2023/0191960 A1* 6/2023 Jeong ..................... B60N 2/045 297/92
2023/0200536 A1* 6/2023 Beech .................. A47C 31/008 297/463.1
2023/0232987 A1* 7/2023 Brandtner ................ A47C 5/12 297/452.55
2023/0278473 A1* 9/2023 Yamaguchi .............. A47C 7/46 297/218.1
2023/0294571 A1* 9/2023 Line ..................... B60N 2/3013 296/65.01
2023/0380597 A1* 11/2023 Li ........................ A47C 1/0355
2024/0023713 A1* 1/2024 Murphy ............... A47C 1/0345
2024/0041215 A1* 2/2024 Spong ................ A47C 1/03255
2024/0049885 A1* 2/2024 Kamiya ................... A47C 7/54
2024/0081540 A1* 3/2024 Chen ...................... A47C 7/541
2024/0122346 A1* 4/2024 Murphy ............... A47C 1/0355
2024/0138568 A1* 5/2024 Yang .................... A47C 1/0355
2024/0138569 A1* 5/2024 Murphy ............... A47C 3/0255
2024/0138577 A1* 5/2024 Yang .................. A47C 1/03211
2024/0148144 A1* 5/2024 Li ........................ A47C 1/0345
2024/0148145 A1* 5/2024 Li ........................ A47C 1/0355
2024/0148148 A1* 5/2024 Shao ...................... A47C 4/028
2024/0156262 A1* 5/2024 Li ........................ A47C 1/0355
2024/0156263 A1* 5/2024 Li ........................ A47C 1/0347
2024/0156274 A1* 5/2024 Hall ......................... B66D 1/60
2024/0164527 A1* 5/2024 Li ........................ A47C 7/5068
2024/0206632 A1* 6/2024 Shi ....................... A47C 19/022
2024/0215726 A1* 7/2024 Li ........................ A47C 1/0345
2024/0277145 A1* 8/2024 Li ............................ A61G 5/14
2024/0277150 A1* 8/2024 Cooper ................ A47C 15/006
2024/0298805 A1* 9/2024 Li ........................ A47C 7/5068
2024/0335039 A1* 10/2024 Lake .................... A47C 1/0355
2024/0335042 A1* 10/2024 Liu ........................ A47C 1/024
2024/0341478 A1* 10/2024 Zhao ........................ A47C 3/03
2024/0341479 A1* 10/2024 Murphy ............... A47C 1/0355
2024/0358156 A1* 10/2024 Wu ........................ A47C 7/546
2024/0365979 A1* 11/2024 Lawson ............... A47C 1/0355
2024/0374031 A1* 11/2024 Tan ...................... A47C 1/0355
2024/0374032 A1* 11/2024 Sun ...................... A47C 1/0355
2024/0389751 A1* 11/2024 Sun .................... A47C 1/03211
2024/0407545 A1* 12/2024 Shi ......................... H04R 1/025
2024/0423369 A1* 12/2024 Loccioni .............. A47C 1/0342
2025/0000260 A1* 1/2025 Cai ...................... A47C 1/0355
2025/0010765 A1* 1/2025 Oka ......................... B60N 2/12
2025/0033544 A1* 1/2025 Oshino ................ B60N 2/5825
2025/0040708 A1* 2/2025 Lake .................... A47C 1/0355
2025/0040709 A1* 2/2025 Lake .................... A47C 1/0355
2025/0057317 A1* 2/2025 Zhou ...................... A47C 17/86
2025/0072612 A1* 3/2025 Zhao .................... A47C 1/0355
2025/0082099 A1* 3/2025 Ye ...................... A47C 1/03211
2025/0089902 A1* 3/2025 Chen .................. A47C 17/2076
2025/0098864 A1* 3/2025 Shi ......................... A47C 7/541
2025/0107624 A1* 4/2025 Dick .................... A47C 1/0355
2025/0134256 A1* 5/2025 Conner .................. A47C 1/121
2025/0151906 A1* 5/2025 Yang .................... A47C 1/0355
2025/0151908 A1* 5/2025 Lei ....................... A47C 1/0242
2025/0160520 A1* 5/2025 Cai ...................... A47C 1/0345
2025/0160521 A1* 5/2025 Cai ...................... A47C 1/0345
2025/0187502 A1* 6/2025 Kim ................... B60N 2/02258
2025/0228368 A1* 7/2025 Wang ................. A47C 1/03211
2025/0236220 A1* 7/2025 Chen .................. B60N 2/02246
2025/0248521 A1* 8/2025 Jiang .................... A47C 1/0345
2025/0261757 A1* 8/2025 Crum ................. A47C 1/03211
2025/0280955 A1* 9/2025 Murphy ............... A47C 15/004
2025/0288112 A1* 9/2025 Ding ...................... A47C 7/624
2025/0288116 A1* 9/2025 Shi ......................... A47C 17/17
2025/0295236 A1* 9/2025 Johnson ................. A47C 1/121
2025/0311848 A1* 10/2025 López Ramírez ..... A47C 1/035

* cited by examiner

ROTATION MECHANISM AND SEAT INCLUDING THE SAME

CROSS-REFERENCE TO RELATED APPLICATIONS

This application claims the benefit of Korean Patent Application No. 10-2023-0179205, filed on Dec. 12, 2023, which application is hereby incorporated herein by reference.

TECHNICAL FIELD

The present disclosure relates to a seat for a vehicle.

BACKGROUND

With the advent of purpose-built vehicles (PBV) and autonomous vehicles, the use and convenience of vehicles are increasing, and accordingly, various technologies are being developed to utilize the space within the vehicles.

One of the technologies may be a seat including a rear-facing function utilizable in the rear seats of a vehicle. Currently, a swivel seat to enable swivel motion and a structure to slide a cushion rearward using a center rail and side guides have been introduced. In case of the swivel seat, there are restrictions as a package that require no interference with the rotation trajectory of the seat. The structure to slide a cushion rearward also has restrictions in that sliding is only possible when there is enough space behind the seat.

The above information disclosed in this Background section is only for enhancement of understanding of the background of the present disclosure, and therefore it may contain information that does not form the prior art that is already known to a person of ordinary skill in the art.

Korean patent 10-2485935 and U.S. counterpart publication 2020/062148 disclose subject matter related to subject discussed herein.

SUMMARY

The present disclosure relates to a seat. More particularly, it relates to a seat for a vehicle.

Some embodiments of the present disclosure can solve the above-described problems associated with the prior art, and accordingly an embodiment of the present disclosure can provide a rotation mechanism, capable of implementing rear-facing mode and full-bed mode of a seat, and the seat including the same.

Some embodiments of the present disclosure can provide a rotation mechanism, capable of putting a seat into rear-facing mode within a limited package space, and the seat including the same.

Some embodiments of the present disclosure can provide a rotation mechanism, capable of reducing cost and weight compared to existing structures, and a seat including the same.

Advantages of the present disclosure are not limited to the foregoing, and other advantages not mentioned herein can be clearly understood by those of ordinary skill in the art to which the present disclosure pertains (hereinafter, "those skilled in the art") based on the description below.

In an embodiment of the present disclosure, a seat can include a seat rest, a backrest rotatable with respect to the seat rest, and a rotation mechanism configured to rotate the backrest with respect to the seat rest, wherein, by the rotation mechanism, the backrest is configured to be rotatable in a first direction within a preset angle range and be rotatable in a second direction within the angle range. Here, the first direction may be opposite the second direction.

In an embodiment of the present disclosure, a rotation mechanism can include a leg bracket, a seat frame disposed to be spaced apart from the leg bracket, a front link configured to connect the leg bracket to the seat frame at a first location and configured to be rotatable with respect to the leg bracket and to the seat frame, respectively, a rear link configured to connect the leg bracket to the seat frame at a second location and configured to be rotatable with respect to the leg bracket and to the seat frame, respectively, a rotation link rotatably coupled to the seat frame at a third location of the seat frame, and a connection link. Here, the connection link may have a first side fixed to the seat frame and may have a second side fixed to the rotation link.

It can be understood that the term "vehicle" or "vehicular" or other similar terms as used herein can be inclusive of motor vehicles in general, such as passenger automobiles including sport utility vehicles (SUV), buses, trucks, tractors, various commercial vehicles, watercraft including a variety of boats and ships, aircraft, and the like, and can include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

BRIEF DESCRIPTION OF THE DRAWINGS

The above and other features of the present disclosure will now be described in detail with reference to certain example embodiments thereof illustrated in the accompanying drawings which are given hereinbelow by way of illustration only, and thus are not necessarily limitative of the present disclosure, and in which.

Figure 1:
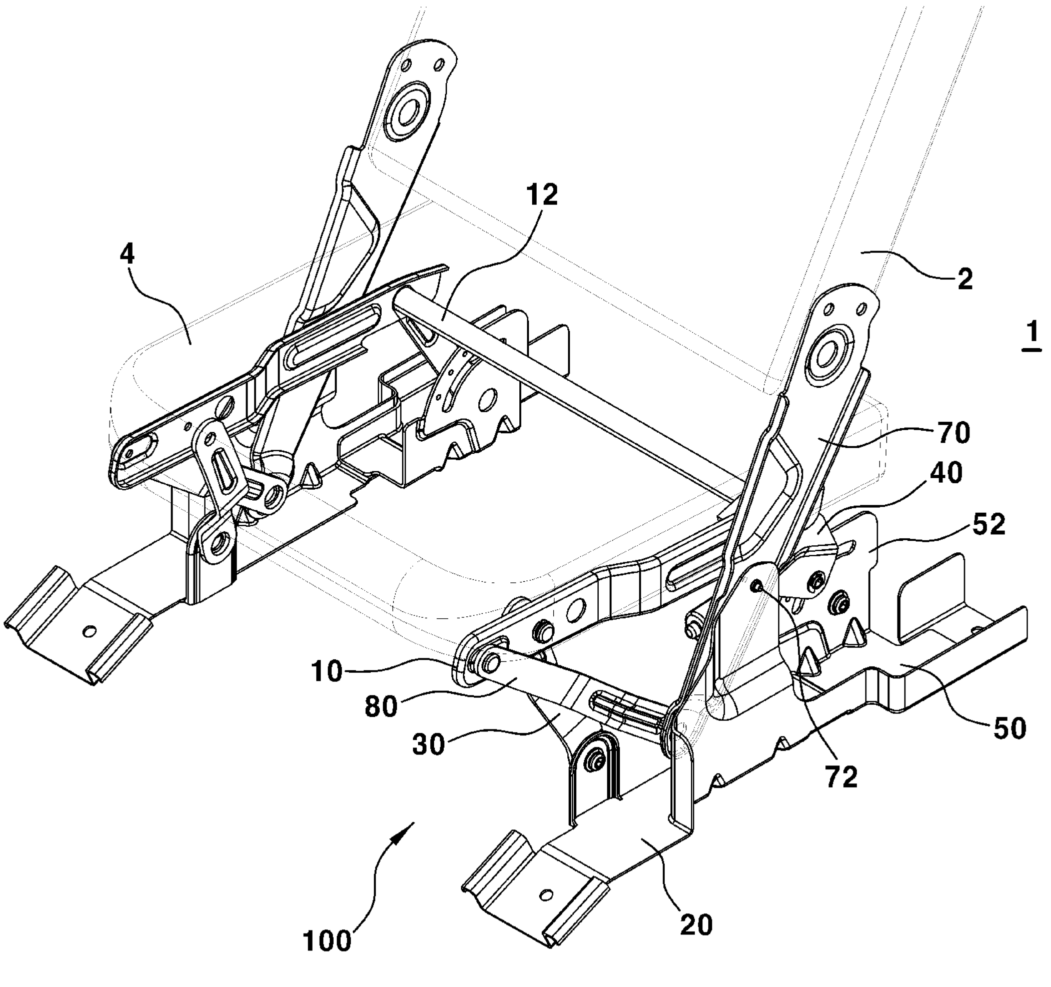
FIG. 1 illustrates a seat including a rotation mechanism according to an embodiment of the present disclosure.

It can be understood that the appended drawings are not necessarily to scale, presenting a somewhat simplified representation of various features illustrative of example embodiments of the present disclosure. For an embodiment, the specific design features of the present disclosure, including, for example, specific dimensions, orientations, locations, and shapes, can be determined in part by the particular intended application and usage environment.

In the figures, the reference numbers can refer to the same or equivalent parts of the present disclosure throughout the several figures of the drawing.

DETAILED DESCRIPTION OF ILLUSTRATIVE EMBODIMENTS

Descriptions of specific structures or functions presented in the example embodiments of the present disclosure are merely examples for the purpose of explaining the present disclosure, and other embodiments according to the present disclosure may be implemented in various forms. In addition, the descriptions should not be construed as being limited to the example embodiments described herein, and can be understood to include all modifications, equivalents, and substitutes falling within the ideas and scopes of the present disclosure.

In the present disclosure, terms such as "first" and/or "second" may be used to describe various components, but the components are not necessarily limited by such terms. Such terms can be merely used to distinguish one component from another. For example, a first component could be termed a second component, and similarly, a second component could be termed a first component, without departing from the scope of the present disclosure.

It can be understood that, when a component is referred to as being "connected to" or "brought into contact with" another component, the component may be directly connected to or brought into contact with the other component, or intervening components may also be present. In contrast, when a component is referred to as being "directly connected to" or "brought into direct contact with" another component, there is no intervening component present. Other terms used to describe relationships between components can be interpreted in a like fashion (e.g., "between" versus "directly between," "adjacent" versus "directly adjacent," etc.).

Throughout the specification, like reference numerals can indicate like components. The terminology used herein is for the purpose of illustrating embodiments and is not intended to necessarily limit the present disclosure. In this specification, the singular form can include the plural sense, unless specified otherwise. The terms "comprises" and/or "comprising" used in this specification mean that the cited component, step, operation, and/or element does not exclude the presence or addition of one or more of other components, steps, operations, and/or elements.

Hereinafter, the present disclosure is described in detail with reference to the accompanying drawings.

Figure 2:
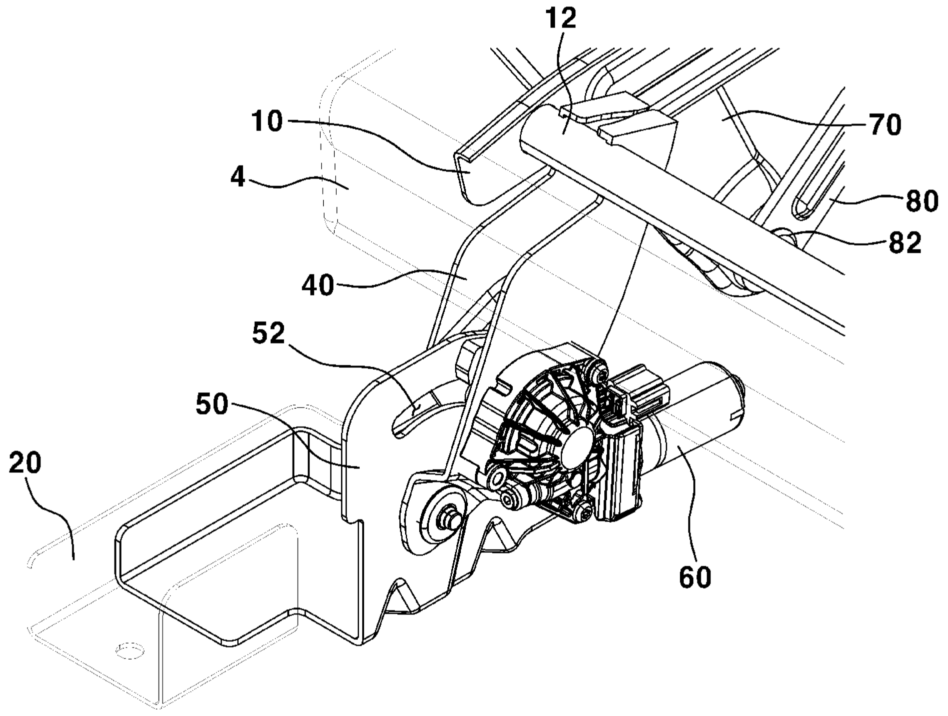
FIG. 2 is an enlarged view of a rear link portion of the seat in FIG. 1, viewed from the inside, according to an embodiment of the present disclosure.
Figure 3:
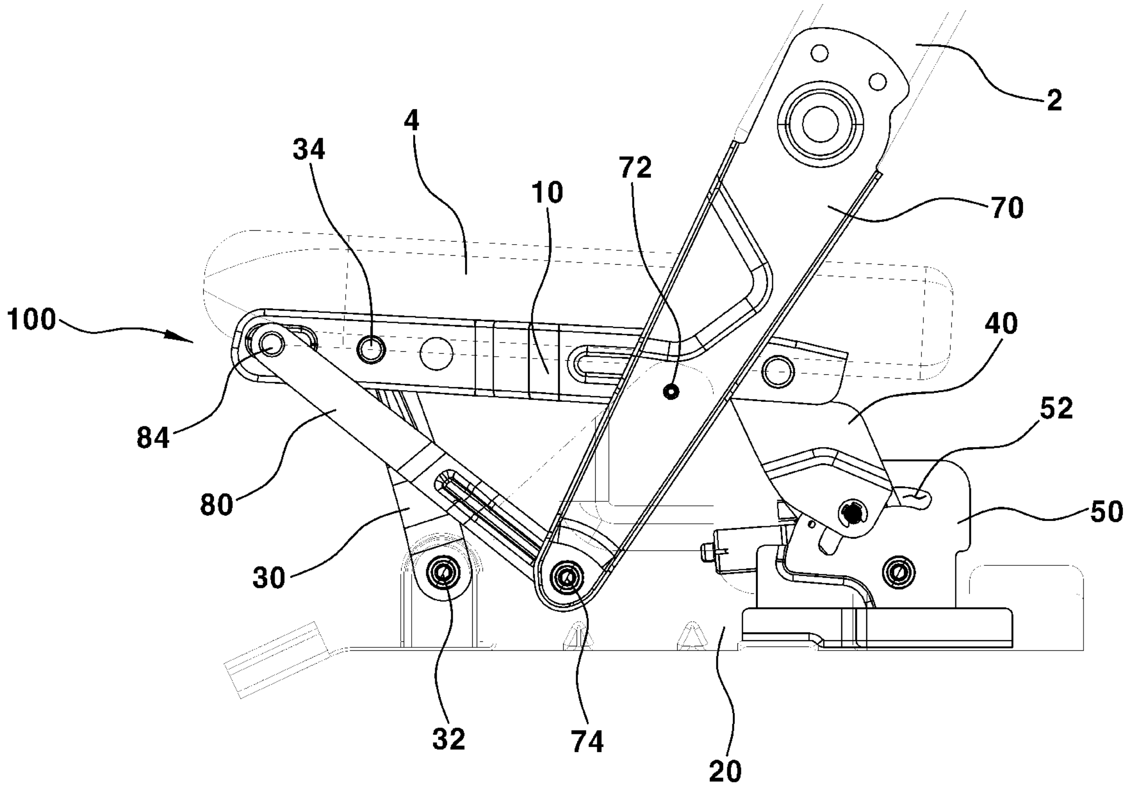
FIG. 3 is a side view of a seat including a rotation mechanism according to an embodiment of the present disclosure.

As illustrated in FIGS. 1 to 3, a seat 1 according to the present disclosure can include a backrest 2 and a seat rest 4. The backrest 2 can be configured to be rotatable with respect to the seat rest 4.

The seat 1 can be configured to be put into rear-facing mode and/or full-bed mode. According to an implementation of the present disclosure, a rotation mechanism 100 may put the seat 1 into rear-facing mode and full-bed mode. In rear-facing mode, the seat 1 can be rotatable and thus an occupant may sit on the seat 1 to face forward or to face rearward. In full-bed mode, the seat 1 can be fully unfolded in a direction substantially parallel to the horizontal direction, allowing the occupant to lie down.

Specifically, rear-facing mode and full-bed mode may be implemented by the rotation mechanism 100. According to an embodiment of the present disclosure, the rotation mechanism 100 may rotate the backrest 2 in a first direction (e.g., clockwise) within a preset angle range. For example, when the backrest 2 is fully unfolded from the seat rest 4 to form 180°, such as in full-bed mode, a first angle range may be 0° to 180°. Moreover, the backrest 2 may rotate in a second direction (e.g., counterclockwise) within a preset angle range. In other words, the backrest 2 may rotate in an angle range of approximately 0° to 180° in both clockwise and counterclockwise directions. Therefore, the seat 1 according to an embodiment of the present disclosure may be put into rear-facing mode and full-bed mode. However, the rotation angle in the first direction and the rotation angle in the second direction do not have to be completely the same, and may be different from each other.

The rotation mechanism 100 can include a four-bar linkage. The four-bar linkage may include a seat frame 10, a leg bracket 20, a front link 30, and a rear link 40.

The seat frame 10 may be in the seat rest 4. The seat frame 10 may form the skeleton of the seat rest 4 to support the seat rest 4. In one example, the seat frame 10 may include portions extending from opposite sides of the seat rest 4, respectively. Moreover, the seat frame 10 may further include a rod 12 configured to connect the portions, each extending from a corresponding one of the opposite sides of the seat rest 4, to each other. In some implementations, the seat frame 10 may not be intended to support the seat rest 4 but may be a structure separately provided on the seat rest 4.

The leg bracket 20 can be at a set, selected, or predetermined distance from the seat frame 10. The leg bracket 20 may be supported by a floor or a support surface (e.g., a floor in a vehicle compartment) and may be fixed. That the leg bracket 20 may be fixed can include that the leg bracket 20 is fixed to the other components of the rotation mechanism 100. In other words, in some implementations, the leg bracket 20 may be provided on a moving rail of the vehicle. The leg bracket 20 installed on the moving rail may move together with the moving rail.

The front link 30 can connect the seat frame 10 to the leg bracket 20 at a first location. For example, the first location may be one end sides of the seat frame 10 and leg bracket 20.

The front link 30 can be configured to be rotatable with respect to the seat frame 10 and to the leg bracket 20, respectively. In one implementation, the front link 30 can include a first pivot point 32 and a second pivot point 34.

The front link 30 may rotate about the first pivot point 32. To allow the front link 30 to rotate about the first pivot point 32, the first pivot point 32 of the front link 30 may be mounted to the leg bracket 20.

The front link 30 may rotate about the second pivot point 34. To allow the front link 30 to rotate about the second pivot point 34, the second pivot point 34 of the front link 30 may be mounted to the seat frame 10.

The rear link 40 can be rotatably connected to the seat frame 10 and to the leg bracket 20, respectively. The rear link 40 may connect the seat frame 10 to the leg bracket 20 at a second location. The second location may be spaced apart from the first location. For example, as in the illustrated implementation, the first location may be front and the second location may be rear.

A first side of the rear link 40 may be mounted to the seat frame 10 and rotatable with respect to the seat frame 10. In one implementation, the first side of the rear link 40 may rotate about the rod 12.

A second side of the rear link 40 may be rotatable with respect to the leg bracket 20. In one implementation, the rear link 40 may be rotatably connected to the leg bracket 20 via a guide bracket 50.

The guide bracket 50 may be mounted to the leg bracket 20. In one implementation, the guide bracket 50 may include a guide 52, which can limit a rotational range of the rear link 40. The second side of the rear link 40 can be mounted to the guide bracket 50 to be rotatable along the guide 52. In some examples, the guide bracket 50 may be integrated with the leg bracket 20. In some examples, the guide bracket 50 may be separate from the leg bracket 20 and be detachably coupled to the leg bracket 20.

As illustrated in FIG. 2, the rotation mechanism 100 may include a motor 60. In one example, the motor 60 may be mounted to the rear link 40. The rear link 40 may rotate by the rotation of the motor 60. The rotation mechanism 100 may move by the rotation of the rear link 40. When the motor 60 is operated, the motor 60 and the rear link 40 can rotate along the guide 52 in the guide bracket 50 fixed to the leg bracket 20, thereby moving the seat frame 10 connected to the rear link 40 and the front link 30.

The rotation mechanism 100 can include a rotation link 70. The rotation link 70 can connect the seat frame 10 to the leg bracket 20 at a third location. In one example, the third location may be between the first location and the second location. For example, the third location may be a point offset by a set, selected, or predetermined distance from the mid-point between the first location and the second location.

The rotation link 70 can be rotatably coupled to the seat frame 10. The rotation link 70 can include a pivot point 72 and may be mounted to the seat frame 10 via the pivot point 72 to be rotatable about the pivot point 72.

A first side of the rotation link 70 may be coupled to the backrest 2, and a second side 74 may be coupled to a connection link 80. When the rotation link 70 rotates, the backrest 2 may rotate together with the rotation link 70. Moreover, the rotation link 70 can be configured to rotate about the second side 74 with respect to the connection link 80.

The rotation mechanism 100 can include the connection link 80. The connection link 80 may be coupled to the seat frame 10 and to the rotation link 70. A first side 82 of the connection link 80 can be fixed to the rotation link 70, and a second side 84 of the connection link 80 can be fixed to the seat frame 10. In one example, between the front link 30 and the rear link 40, the first side 82 of the connection link 80 may be coupled to the second side 74 of the rotation link 70.

Figure 4:
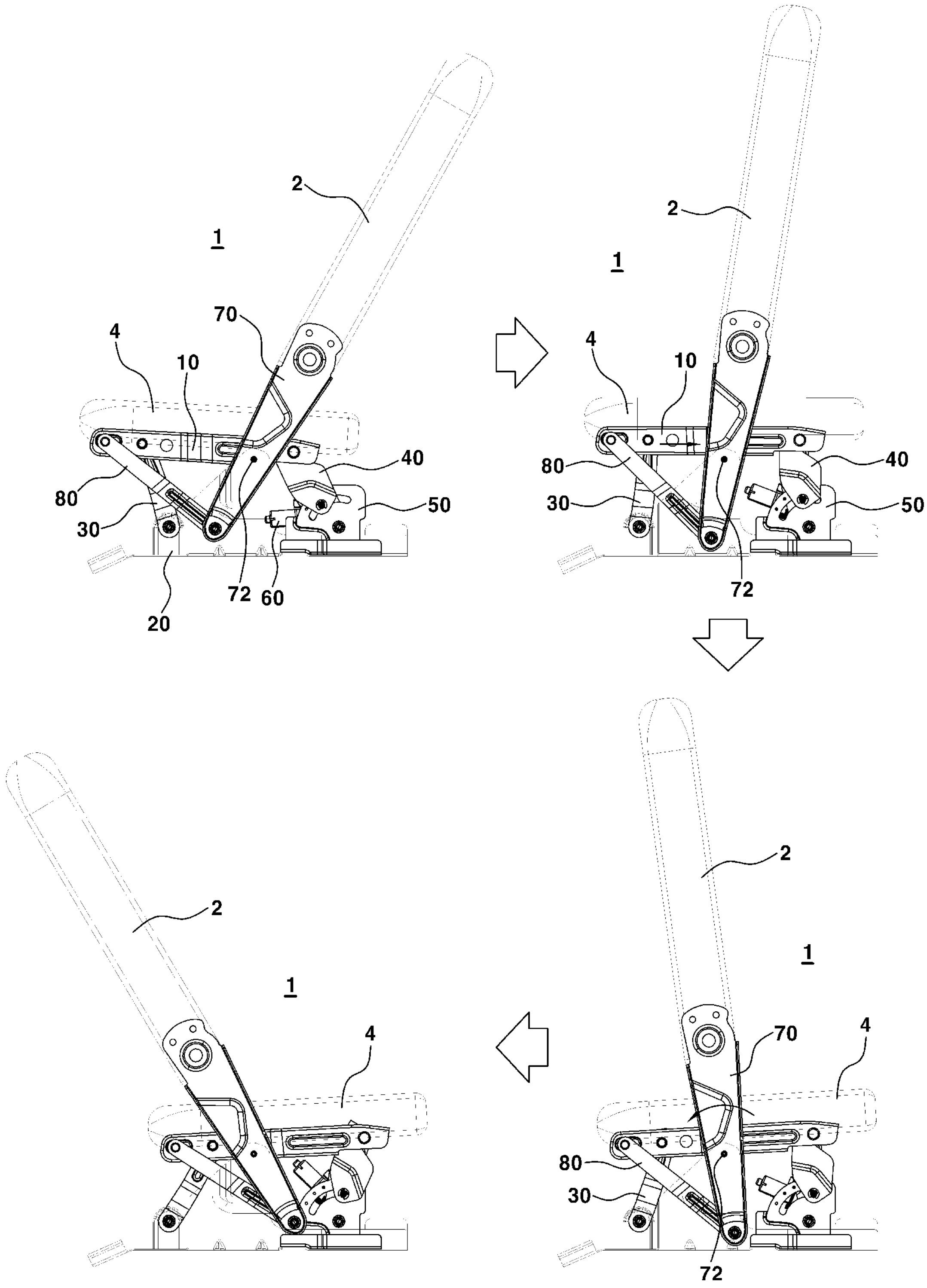
FIGS. 4 and 5 illustrate a process of putting a seat including a rotation mechanism according to an embodiment of the present disclosure into rear-facing mode.
Figure 5:
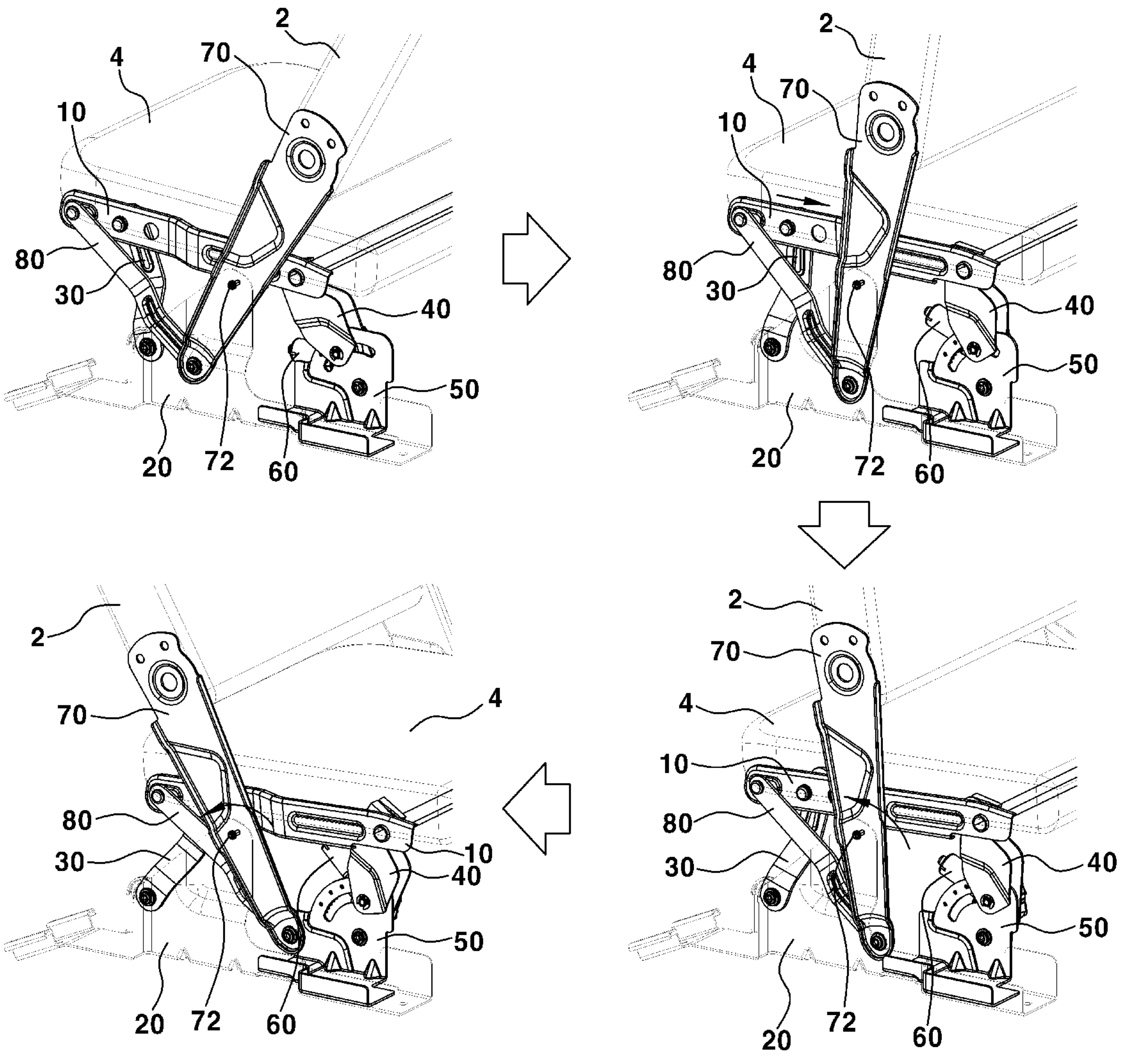

Referring to FIGS. 4 and 5, the rotation mechanism 100 according to an embodiment of the present disclosure may put the seat 1 into rear-facing mode.

On the top left of FIGS. 4 and 5, the rotation mechanism 100 and the seat 1 are arranged in the original positions thereof. As shown in the top right of FIGS. 4 and 5, when the motor 60 is operated, the motor 60 and the rear link 40 can rotate. The rear link 40 can rotate with respect to the guide bracket 50 while moving along the guide 52. When the rear link 40 rotates, the seat frame 10 connected to the rear link 40 via the four-bar linkage can move and the front link 30 can be rotated. When the seat frame 10 moves, the connection link 80 can move together with the seat frame 10. As shown in the bottom right of FIGS. 4 and 5, the second side 74 of the rotation link 70 starts to be pushed by the movement of the connection link 80. When continuously pushed by the connection link 80, the rotation link 70 can rotate forward about the pivot point 72, and accordingly, the backrest 2 can rotate together therewith. By the additional movement of the connection link 80, the seat 1 may be rotated in the opposite direction at an angle substantially equal to the angle of the original position of the seat 1, putting the seat 1 into rear-facing mode. As such, the rotation mechanism 100 according to an embodiment of the present disclosure may put the seat into rear-facing mode without a swivel mechanism or rail, which can reduce cost and weight compared to existing technologies.

Figure 6:
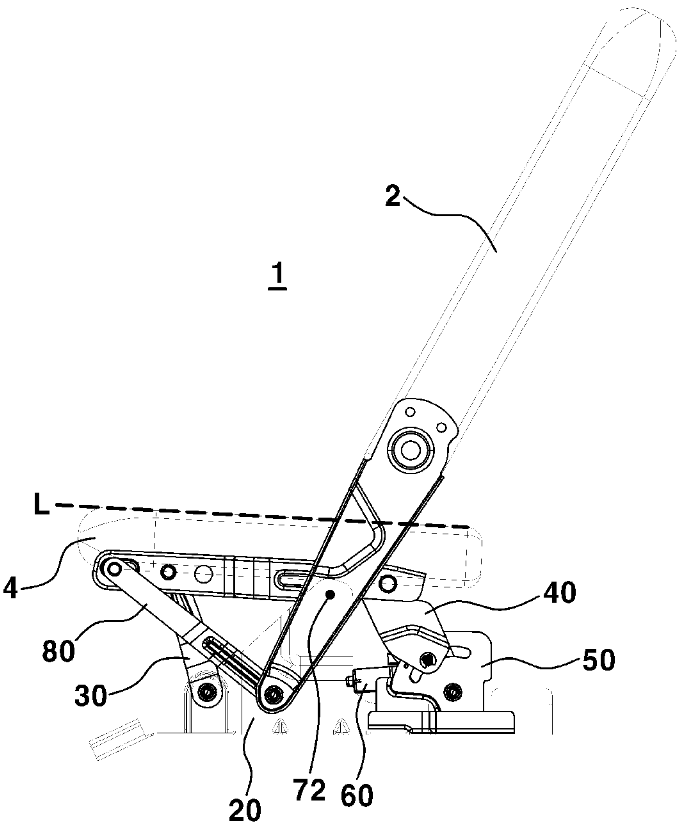
FIG. 6 is a side view of a seat including a rotation mechanism according to an embodiment of the present disclosure.

Referring to FIG. 6, the seat rest 4 can be configured to form a set or predetermined angle L with respect to the horizontal direction. The seat rest 4 can be inclined at the set or predetermined angle L, increasing the sense of comfort. In rear-facing mode also, the seat rest 4 may maintain the set or predetermined angle L.

Figure 7:
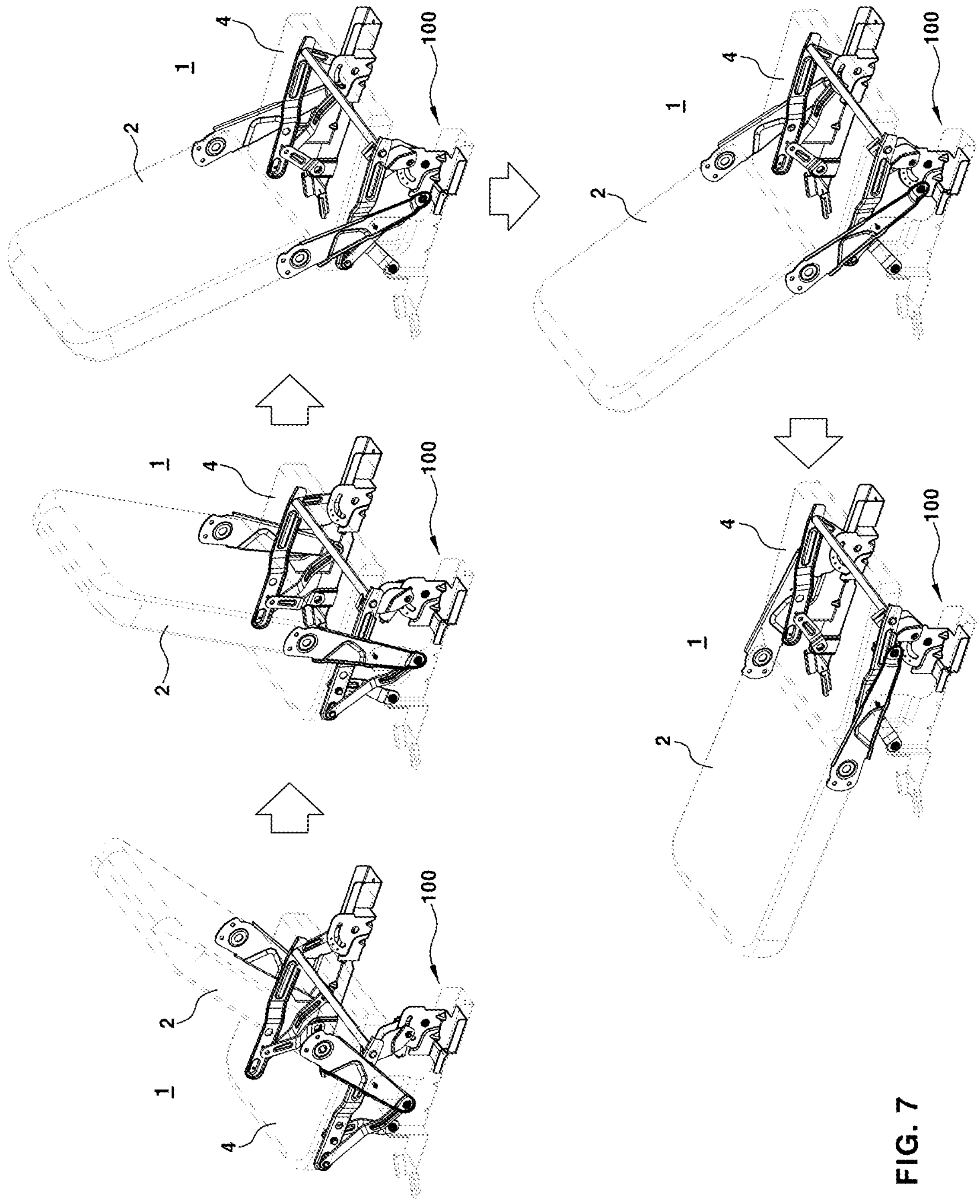
FIGS. 7 and 8 illustrate a process of putting a seat including a rotation mechanism according to an embodiment of the present disclosure into full-bed mode.
Figure 8:
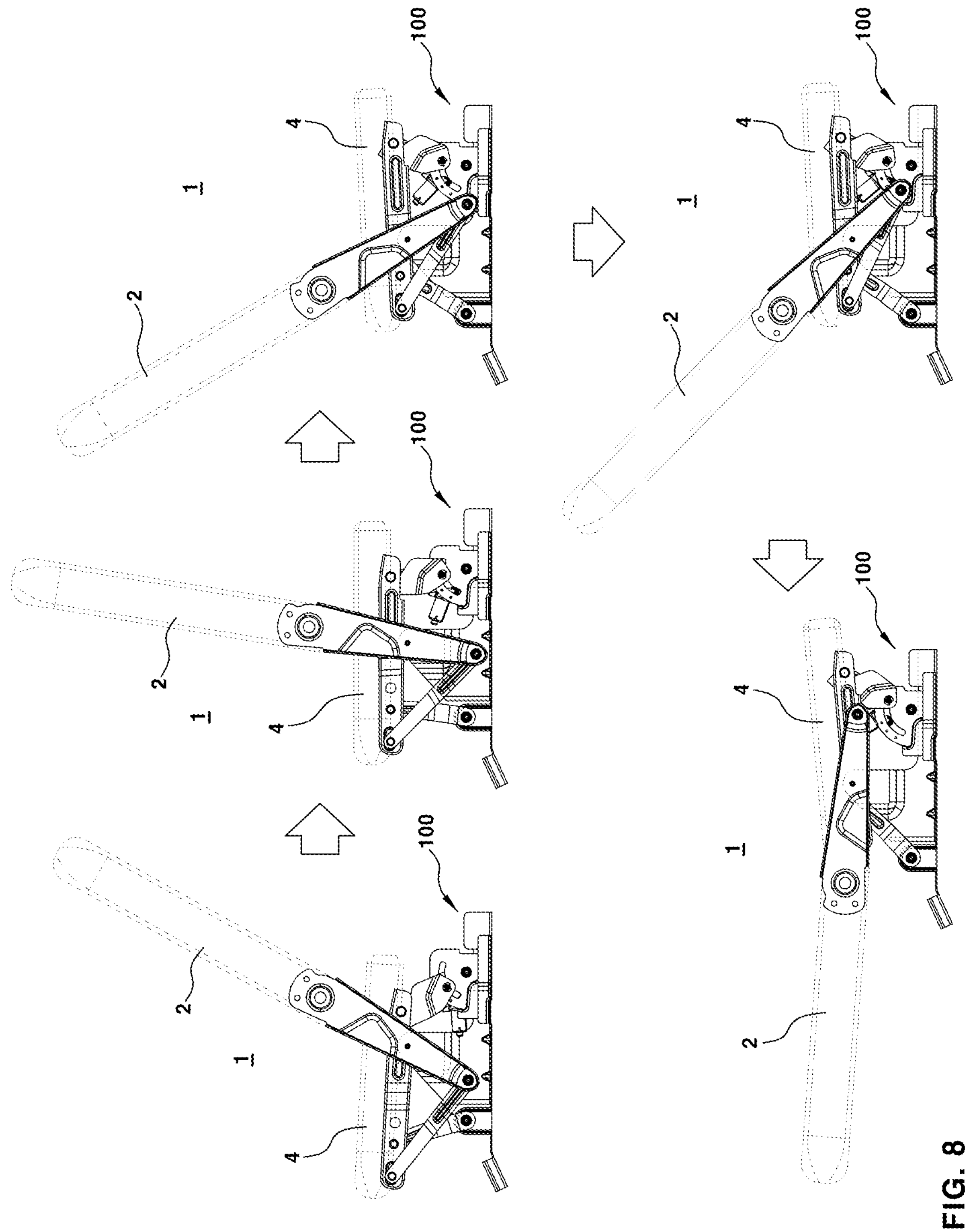

As illustrated in FIGS. 7 and 8, full-bed mode may be implemented by additionally operating the motor 60 in a state in which the seat 1 is in rear-facing mode. The process of implementing full-bed mode can be the same as that of rear-facing mode, and thus redundant explanations will be omitted.

In some implementations of the present disclosure, the seat 1 may include the rotation mechanism 100. The seat 1 including the rotation mechanism 100 may be put into rear-facing mode and full-bed mode.

The seat 1 according to an embodiment of the present disclosure may be provided in a vehicle. According to an implementation of the present disclosure, the seat 1 may be applied in the rear seats of a vehicle. However, application of the seat 1 according to an embodiment of the present disclosure is not necessarily limited to vehicles.

According to an embodiment of the present disclosure, provided can be a rotation mechanism, capable of implementing rear-facing mode and full-bed mode of a seat, and the seat including the same.

According to an embodiment of the present disclosure, provided can be a rotation mechanism, capable of putting a seat into rear-facing mode within a limited package space, and the seat including the same.

According to an embodiment of the present disclosure, provided can be a rotation mechanism, capable of reducing cost and weight compared to existing structures, and a seat including the same.

Advantages of the present disclosure are not limited to what has been described above, and other advantages not mentioned herein can be clearly recognized by those skilled in the art based on the above description.

It can be apparent to those of ordinary skill in the art to which the present disclosure pertains that the present disclosure described above is not limited by the above-described example embodiments and the accompanying drawings, and various substitutions, modifications, and changes are possible within a range that does not depart from the technical ideas of the present disclosure.

What is claimed is:

1. A seat comprising:

a seat rest comprising a seat frame;

a backrest coupled to and rotatable with respect to the seat rest; and a rotation mechanism coupled to the backrest and the seat rest and configured to rotate the backrest with respect to the seat rest, wherein, by the rotation mechanism, the backrest is configured to rotate in a first direction within a preset angle range, and wherein, by the rotation mechanism, the backrest is configured to rotate in a second direction within the preset angle range, wherein the first direction is opposite the second direction, and wherein the rotation mechanism includes:

a leg bracket configured to be attached to a support surface, wherein the seat frame is movably coupled to the leg bracket;

a rotation link coupled to the seat frame and coupled to the backrest; and a connection link, wherein a first side of the connection link is rotatably coupled to the seat frame, and a second side of the connection link is rotatably coupled to the rotation link.

2. The seat of claim 1, wherein the preset angle range is 0 to 180 degrees.

3. The seat of claim 1, wherein the rotation mechanism further comprises:

a front link configured to connect the leg bracket to the seat frame at a first location and configured to rotate with respect to the leg bracket and to the seat frame, respectively; and a rear link configured to connect the leg bracket to the seat frame at a second location and configured to rotate with respect to the leg bracket and to the seat frame, respectively.

4. The seat of claim 3, wherein the rotation link is coupled to the seat frame at a third location of the seat frame, and the third location is between the first location and the second location.

5. The seat of claim 3, wherein a first rotation link side of the rotation link is attached to the backrest, and a second rotation link side of the rotation link is coupled to the second side of the connection link.

6. The seat of claim 3, wherein the second side of the connection link is coupled to the rotation link between the front link and the rear link.

7. The seat of claim 3, further comprising a motor configured to supply a rotational force to the rotation mechanism.

8. The seat of claim 7, wherein the motor is mounted to the rear link to rotate the rear link.

9. The seat of claim 8, further comprising a guide provided in the leg bracket and configured to guide a rotation of the rear link.

10. A vehicle comprising the seat of claim 1.

11. A rotation mechanism comprising:

a leg bracket;

a seat frame spaced apart from the leg bracket;

a front link configured to connect the leg bracket to the seat frame at a first location and configured to rotate with respect to the leg bracket and to the seat frame, respectively;

a rear link configured to connect the leg bracket to the seat frame at a second location and configured to rotate with respect to the leg bracket and to the seat frame, respectively;

a rotation link rotatably coupled to the seat frame at a third location of the seat frame; and a connection link, wherein a first side of the connection link is coupled to the seat frame, and a second side of the connection link is coupled to the rotation link.

12. The rotation mechanism of claim 11, wherein the third location is between the first location and the second location.

13. The rotation mechanism of claim 11, wherein the second side of the connection link is coupled to the rotation link between the front link and the rear link.

14. The rotation mechanism of claim 11, further comprising a motor mounted to the rear link to supply a rotational force to the rear link.

15. The rotation mechanism of claim 14, further comprising a guide provided in the leg bracket and configured to guide a rotation of the rear link, wherein the guide limits rotation of a backrest within a preset angle range.

16. The rotation mechanism of claim 15, further comprising a guide bracket comprising the guide, wherein the guide bracket is detachably mounted to the leg bracket.

17. A seat comprising:

a seat rest comprising a seat frame;

a backrest; and a rotation mechanism couples the backrest to the seat rest in a configuration for providing selectable seat positions including a forward-facing upright position, a rear-facing upright position, and a full-bed position, wherein the rotation mechanism is configured to rotate the backrest about a horizontal-lateral axis in an angle range relative to the seat rest, wherein the rotation mechanism includes:

a leg bracket configured to be attached to a support surface, wherein the seat frame is movably coupled to the leg bracket;

a rotation link coupled to the seat frame and coupled to the backrest; and a connection link, wherein a first side of the connection link is rotatably coupled to the seat frame, and a second side of the connection link is rotatably coupled to the rotation link.

18. The seat of claim 17, wherein the angle range is 0 to 180 degrees.

19. The seat of claim 17, wherein the rotation mechanism further comprises:

a front link configured to connect the leg bracket to the seat frame at a first location and configured to rotate with respect to the leg bracket and to the seat frame, respectively; and a rear link configured to connect the leg bracket to the seat frame at a second location and configured to rotate with respect to the leg bracket and to the seat frame, respectively.

20. The seat of claim 19, further comprising:

a motor mounted to the rear link to supply a rotational force to the rear link; and a guide provided in the leg bracket and configured to guide a rotation of the rear link, wherein the second side of the connection link is coupled to the rotation link between the front link and the rear link.

* * * * *